US005369930A

United States Patent [19]

Kreizinger

[11] Patent Number: 5,369,930

[45] Date of Patent: Dec. 6, 1994

[54] METHOD OF MANUFACTURING A HOLLOW CORE, CONCRETE BUILDING PANEL

[76] Inventor: Kenneth R. Kreizinger, 2724 NE. 35th St., Fort Lauderdale, Fla. 33306

[21] Appl. No.: 72,368

[22] Filed: Jun. 3, 1993

Related U.S. Application Data

[63] Continuation of Ser. No. 783,141, Oct. 28, 1991, abandoned, which is a continuation-in-part of Ser. No. 463,303, Jan. 10, 1990, abandoned.

[51] Int. Cl.$^5$ .......... B28B 1/02; B28B 1/16; B32B 31/06; E04B 1/16

[52] U.S. Cl. .......... 52/745.2; 52/745.1; 52/745.13; 52/745.21; 156/242; 156/292; 156/297; 156/300; 264/35; 264/253; 264/254; 264/256; 264/261; 264/263; 264/267; 264/277; 264/279; 264/310

[58] Field of Search .......... 264/31-35, 264/251, 253, 263, 261, 256, 254, 259, 274, 277, 279, 310, 267; 52/800, 807, 785, 741-747; 156/300, 292, 297, 242

[56] References Cited

U.S. PATENT DOCUMENTS

| | | | |
|---|---|---|---|
| 937,142 | 10/1909 | Chappelow | 264/279.1 X |
| 1,070,921 | 8/1913 | Saltiel | 264/35 X |
| 1,326,400 | 12/1919 | Halverson et al. | 264/35 |
| 1,398,209 | 11/1921 | Bavegem | 264/256 X |
| 1,535,690 | 4/1925 | Selmer | 264/275 X |
| 1,619,570 | 3/1927 | Duchemin | 264/35 |
| 1,841,581 | 1/1932 | Garrett | 264/31 |
| 1,841,586 | 1/1932 | Garrett | 264/31 |
| 1,955,716 | 4/1934 | Waller | 264/35 |
| 1,963,979 | 6/1934 | Garrett | 264/35 |
| 2,305,684 | 12/1942 | Foster | 264/255 X |
| 2,370,638 | 3/1945 | Crowe . | |
| 2,443,961 | 6/1948 | Pelatowski | 264/279 X |
| 2,457,982 | 1/1949 | Deichmann . | |
| 2,649,135 | 8/1953 | Prase | 156/292 X |
| 2,655,710 | 10/1953 | Roensch et al. . | |
| 2,668,788 | 2/1954 | Waldherr | 156/297 X |
| 3,238,278 | 3/1966 | Stark . | |
| 3,573,144 | 3/1971 | Andersen | 156/300 X |
| 3,691,714 | 9/1972 | Stepp | 52/743 |
| 3,744,202 | 7/1973 | Habmann . | |
| 4,077,177 | 3/1978 | Boothroyd et al. | 264/32 X |
| 4,285,902 | 8/1981 | Braverman | 264/275 X |
| 4,338,759 | 7/1982 | Swerdlow et al. | 52/743 |
| 4,360,993 | 11/1982 | Tomokazu et al. | 52/743 X |
| 4,394,201 | 7/1983 | Haeussler | 264/274 X |
| 4,479,916 | 10/1984 | Blatchford . | |
| 4,554,124 | 11/1985 | Sudrabin | 264/35 X |
| 4,632,796 | 12/1986 | Moulet . | |
| 4,671,032 | 6/1987 | Reynolds | 52/807 X |
| 4,731,971 | 3/1988 | Terkl | 52/743 |
| 4,783,935 | 11/1988 | Creager | 52/743 X |
| 4,822,661 | 4/1989 | Battaglia | 156/292 X |

FOREIGN PATENT DOCUMENTS

| | | | |
|---|---|---|---|
| 2533602 | 3/1984 | France | 264/35 |

*Primary Examiner*—Karen Aftergut
*Attorney, Agent, or Firm*—White & Case

[57] ABSTRACT

A manufacturing process enables the connection of two separately finished skins (12A & 12B) with spacers (14 & 16). The panels are manufactured by casting a first skin (12A), and then attaching the spacers (14 or 16) to the internal side of the first skin, and then casting a second skin (12B) and attaching the spacers to the internal side of the second skin. The lightweight panel (10) also contains internal formwork (15) for structural columns (33) and beam (34) which are cast in situ after the panel has been placed.

17 Claims, 13 Drawing Sheets

METHOD OF MANUFACTURING A HOLLOW CORE, CONCRETE BUILDING PANEL

CROSS-REFERENCE TO RELATED APPLICATIONS

This application is a continuation of application Ser. No. 783,141, filed on Oct. 28, 1991, now abandoned, which is a continuation-in-part of application Ser. No. 463,303, filed Jan. 10, 1990, now abandoned.

BACKGROUND OF THE INVENTION

1. Field of the Invention

This invention relates to hollow core concrete building panels, which are utilized as walls, ceilings, floors, roofs, columns and the like, and specifically to improved methods of manufacturing, installing and providing load bearing structure for said panels.

2. Description of Prior Art

The desirability of hollow core concrete building panels is well known. The lighter weight allows the construction of larger panels, reduces transportation costs, and permits the use of smaller handling equipment. Furthermore, the hollow core area is ideal for insulating materials as well as a way to decrease the amount of concrete necessary for a structurally sound panel.

There are basically two types of hollow core concrete panels in use and distinguished by the manufacturing process and the type of connection between the two skins. The first type of panel has a concrete connection between the skins and is monolithically cast using special formwork to create the hollow core area. The second type of panel consists of two, separately cast skins, which are connected by an elaborate wire or metal structure to facilitate the creation of the hollow core area.

These existing hollow core concrete panels have a variety of limitations that adversely affect their cost, finished appearance and flexibility. For example, the monolithically cast panels allow for only a single side to be horizontally cast in a form liner mold which leaves the second face roughly finished and in need of additional work. Furthermore, to create the hollow core area for the monolithic panel, the manufacturing process requires extensive internal forms, which are either left in place or provided by expensive and cumbersome equipment, both of which increases the panel's cost.

Those hollow core panels composed of separately cast skins are held together by extensive fabricated wire or metal structures that substantially add to the cost. Due to the weight of the individual skins and the tenuous connections, these panels are prone to shifting unless they are welded, have additional supports, and utilize an over abundance of wire. Furthermore, one variation of this panel requires the hollow core area to be filled with a cementitious or other solid material after it has been placed at the job site in order to provide the panel with permanent stability and the necessary structural support. In other panel design variations, thicker skins are required and another material layer is added during manufacturing to act as forming for the hollow core area. However, because of the additional requirements, neither of these panel designs provide for any real material savings over conventional methods.

In all cases, the thickness of the panel skin is dependent upon the type of structural forces to which it is subject. These panels are typically designed for load bearing purposes which require a thicker prefabricated skin than necessary to withstand only lateral forces. Therefore, the thicker skins required by the these existing hollow core panels require more concrete and reinforcement material which in turn increases the panel's cost and weight and makes handling more difficult.

The existing hollow core panels offer little flexibility in terms of customizing their structural integrity and material requirements for different applications. In certain situations, the handling method requires the panel to have greater structural strengths than are necessary for the application intended. Thus, in many instances, these panels contain much more material and structural strength than is needed for the particular application. This causes the panels to be uneconomical replacements for conventional materials and methods.

Finally, most of the existing concrete building panels require a continuous foundation which offers no advantage over conventional construction. Furthermore, many of these panels are difficult to integrate into a typical building project and require additional steps such as welding to connect them with other materials. These additional steps makes them less desirable or uneconomical for many building applications and projects.

SUMMARY OF THE INVENTION

The present invention provides a highly flexible, concrete building panel design and low cost manufacturing process that enables the connection of two separately finished skins with a solid cementitious bond while creating a hollow core area between said skins. The lightweight panel contains internal formwork for the structural columns and beam which are cast in situ after said panel has been placed. In addition, said hollow core area may be left hollow, partially filled or totally filled with various types of insulating materials as may be desired for a particular application.

Due to the high quality finish of both skins, the panel offers significant cost savings in each of its numerous applications. Furthermore, the presence of the hollow core area allows the panel to be customized for different structural or insulating applications. The panel may be used for structural or non-structural purposes, for wall, floor and roof panels and for non-building purposes such as noise barriers, fence walls and retaining walls.

The present invention is a lightweight, concrete building panel having a pair of skins which are separated by and bonded together by-a plurality of individual, preferably cementitious, spacers which create an internal, hollow core area between said skins while only occupying a fraction of the hollow core area.

Preferably, internal formwork is supported between the skins, which defines a volume for casting columns or beams in situ after the panel has been placed, while retaining the hollow core area. Thus the majority of the structural elements, materials and weight will be created during the installation process, after the panel has been manufactured and handled. This internal formwork also provides a more efficient design and utilization of the materials needed for structural purposes and can easily be altered and customized to meet the different structural requirements for various applications.

A building panel according to the invention retains substantial flexibility for use of the hollow core area in that it may be left void, partially filled or totally filled with a variety of materials or combinations to meet whatever requirements or functions that may be desired for a particular application. For example, the hollow core area may be filled with a fibrous or other acoustical material to form a sound-absorbing panel. Preferably, one skin is provided with a plurality of perforations that extend through to the core area and insulating material, in order to enhance the sound absorbing properties.

In a preferred embodiment of the invention, the panel is provided with two high quality finished outer faces that are horizontally cast and may be created by a form liner, the use of aggregates or by attaching various cladding materials during the manufacturing process.

The invention provides a method by which various cladding materials may be attached to the panel's finished face during the manufacturing process.

A panel according to the invention is adaptable to use with either a continuous foundation or with only a column footer cast prior to or after the panel has been set in place.

A building panel according to the invention may easily be utilized with conventional building methods and materials.

A panel according to the invention may be formed utilizing simple, inexpensive molding equipment and processes, which are easily adaptable for different size and shape configurations and can be used on the building site. Such a process includes an open working environment to provide ease of access to manufacture each skin and for embedding or attaching utilities, insulation, window and door frames or other items into the panel or provide for any other internal functions.

A hollow core panel according to this invention provides a highly flexible, prefabricated building component that is easily altered and custom designed to effectively and efficiently satisfy many different applications.

Due to its lightweight structure, panels according to the invention may be handled easily and quickly using small equipment and providing internal connections.

For a better understanding of the invention, reference is made to the following detailed description of the preferred embodiments, taken in conjunction with the drawings accompanying the application.

DESCRIPTION OF THE PREFERRED EMBODIMENTS

Figure 1:
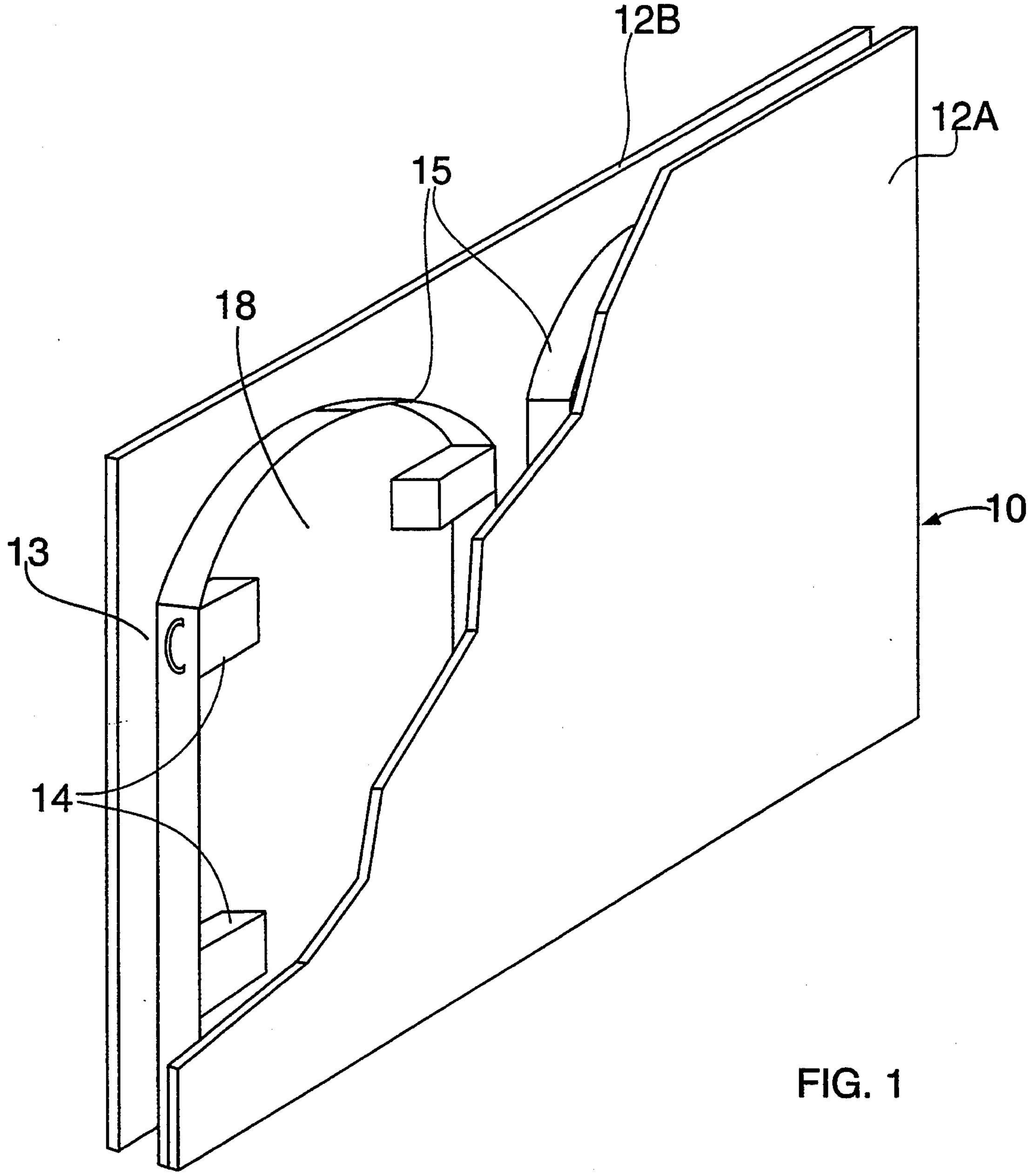
FIG. 1 is a perspective view of a typical wall panel detailing the interior core area formwork, the solid spacers and the finished, exterior skins.

A first embodiment of a concrete, hollow core building panel is generally shown in FIG. 1. The panel 10 is composed of two thin concrete skins 12A and 12B that are connected by concrete spacers 14 which are partially embedded or otherwise bonded to the skins 12A and 12B. The spacers 14 may be of different shapes, configurations and materials, including concrete, plastic and other materials, and may also contain reinforcement material such as wire mesh to enhance their individual strength, or include connecting material (such as rods or wire mesh) that projects outwardly from one or both ends of the spacer and which can be embedded in the skins 12A and/or 12B to form a mechanical connection between the spacers and skins. The spacers preferably are solid but may instead be hollow, tubular, or partially hollow (e.g., have one or more holes extending through, or partly through, the spacer).

The panel design optionally includes internal formwork 15, used for concrete columns and beams that are cast in situ after the panels have been placed. The formwork 15 forms the perimeter of the hollow core area 18, and prevents concrete and other materials from entering the hollow core area, while also providing the formwork for the columns and beam that are internal to the panel 10, and cast in situ. The internal formwork 15 may be composed of several different types of materials and placed in different locations to achieve more or larger columns and beams. This formwork 15 is also partially embedded or otherwise connected to the skins 12A and 12B and remains permanently in place after the columns and beam have been cast.

In order to facilitate the easy handling of the panels, hooks 13 may be embedded into the spacers 14, or otherwise attached to the panel 10.

Figure 2:
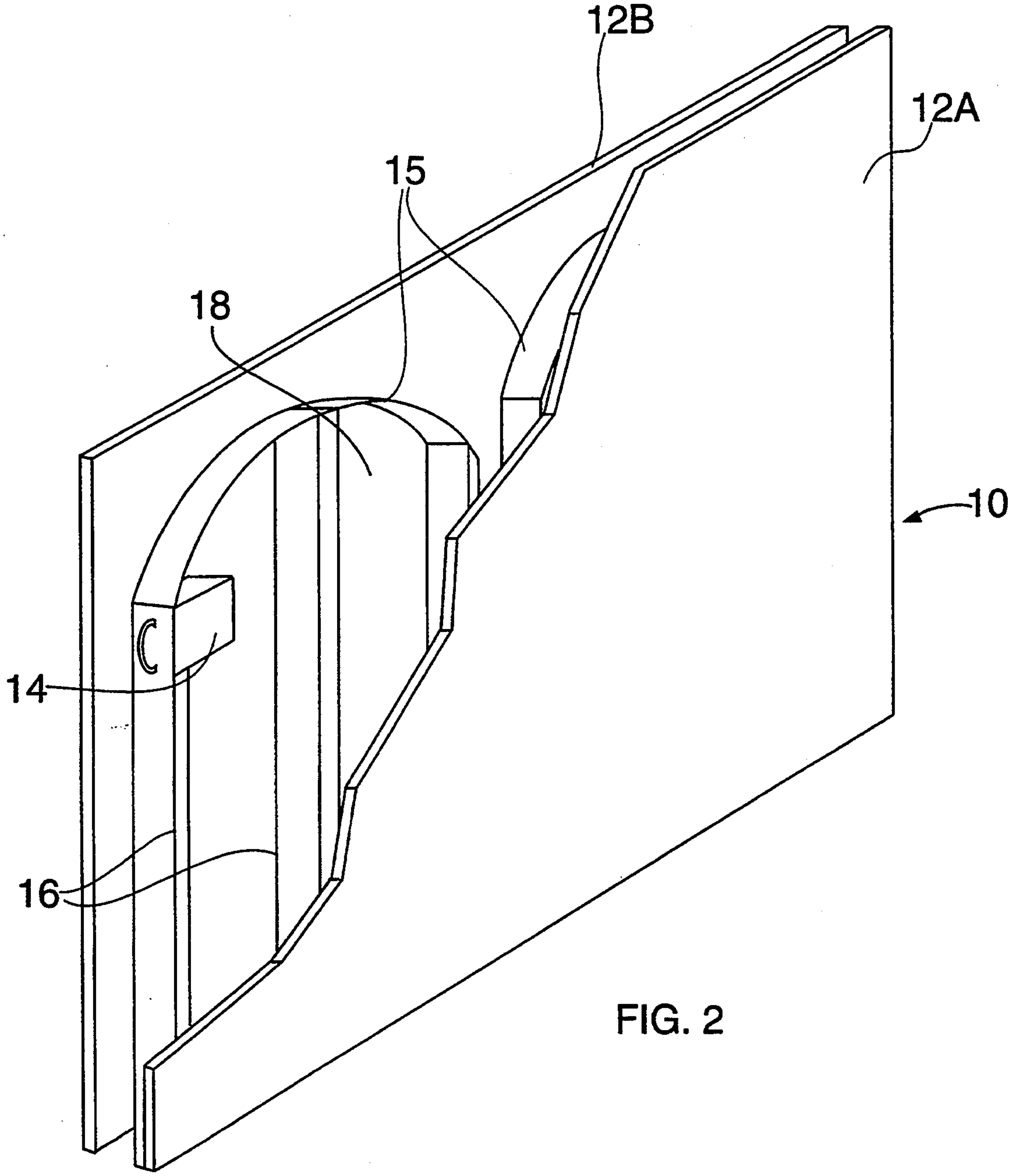
FIG. 2 is a typical wall panel that shows an alternative spacer design for the interior core area.

FIG. 2 shows two alternative design configurations of spacers, i.e., cube type spacers 14 and elongated rectangular type spacers 16. The spacers 14, 16 are contained in the hollow core interior 18 defined by formwork 15.

Figure 3:
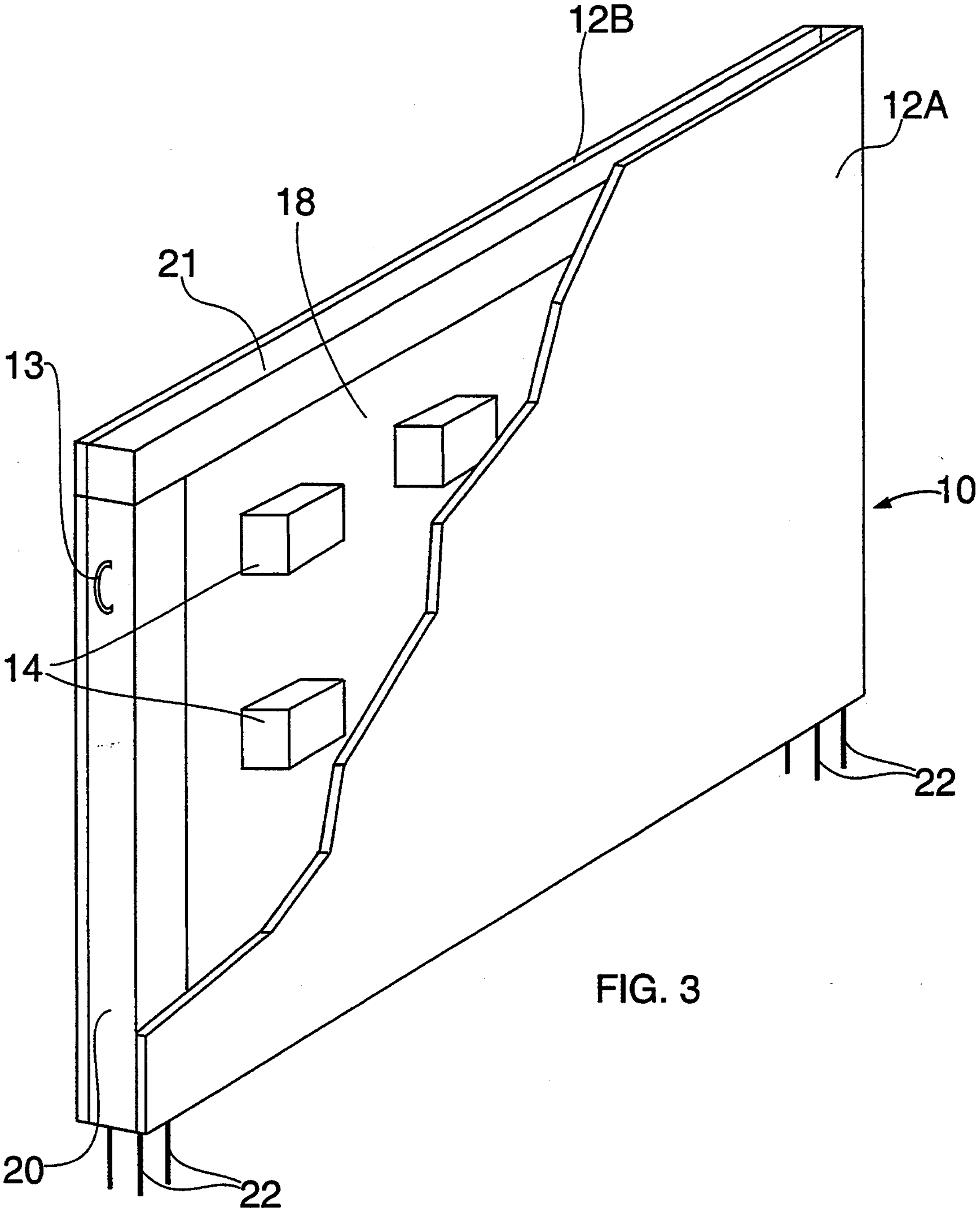
FIG. 3 is another design alternative that shows both the internal spacers and the panel's columns and beam pre-cast as part of the manufacturing process.

FIG. 3 shows a variation of the panel design where the columns 20 and beam 21 have been placed within the panel during the manufacturing process as opposed to being cast in situ at the building site, and wherein the columns and beams 20, 21 define the hollow core 18. 0f special note are the reinforcement bars 22, protruding from the columns, which may also be used with the beam. These reinforcement bars 22 are designed to be set in formwork at the building site and cast in situ thereby creating the structural bond between the panel and the foundation or other adjoining structure.

Figure 4:
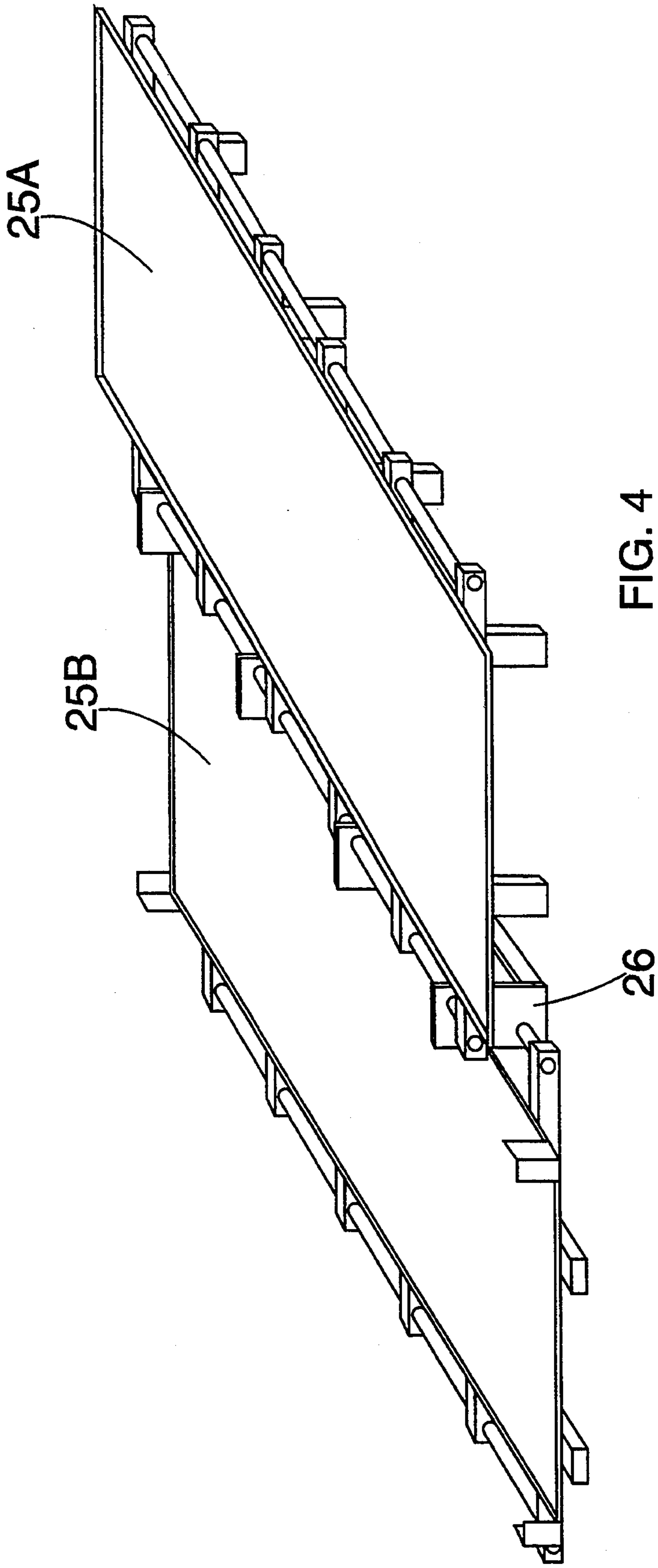
FIG. 4 is a perspective view of the panel's forming equipment and the two molds used in it's manufacturing process.

FIG. 4 shows an example of forming equipment that may be used to manufacture the panel. Included are the two molds 25A and 25B, and a central hinge device 26, over which the two skin molds rotate. A special feature of this manufacturing process is the ability to cast each skin in an open work environment to facilitate placement of the internal spacers and formwork, along with utilities and other objects that are to be contained within the walls.

The manufacturing equipment may consist of a single unit or three or more separate parts brought together for rotating or removing a panel. The equipment may be fixed, transportable or even mobile.

Figure 5:
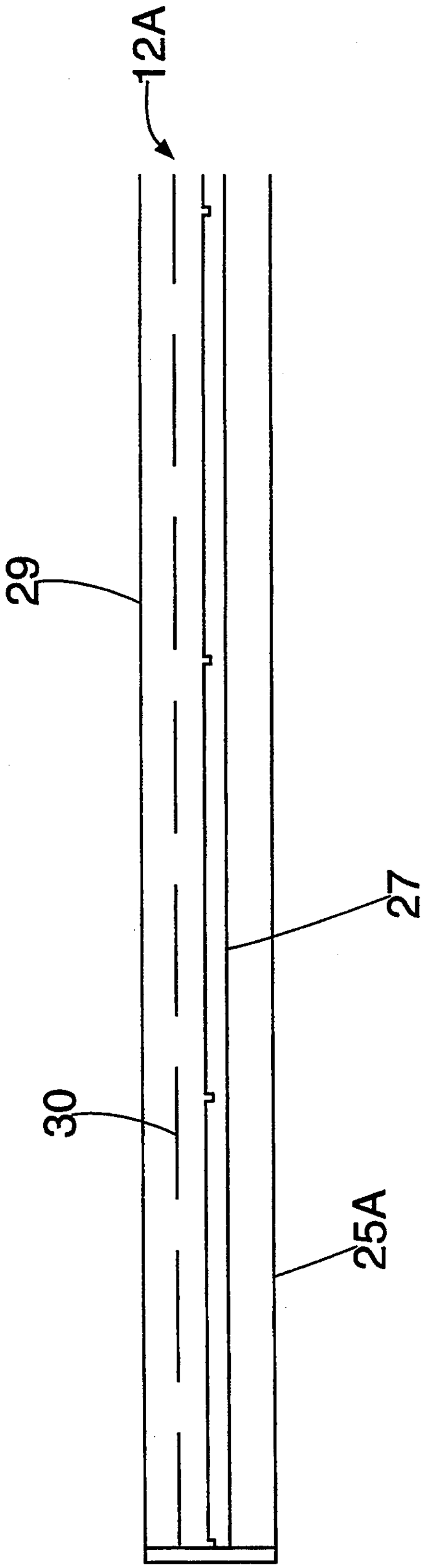
FIG. 5 is a cross section of a typical panel skin, as it is being cast in a mold.
Figure 9:
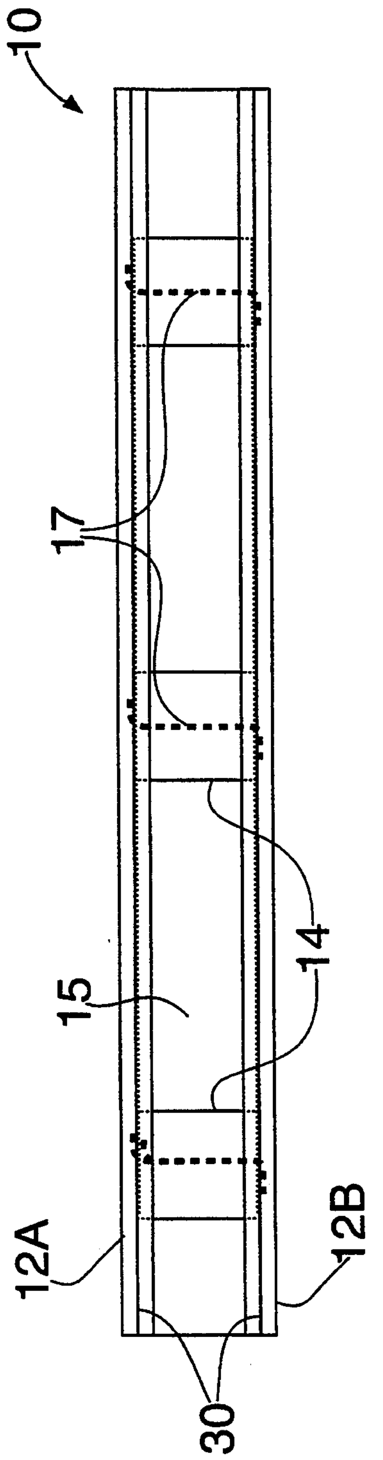
FIG. 9 is a detailed cross section of a completed panel as it would appear in FIG. 8 when the molds are removed.

The preferred manufacturing process begins by casting a first skin 12A in a horizontal mold 25A, as shown in FIG. 5. Prior to casting the cementitious material, either a form liner or some type of cladding material 27 may be set in the bottom of the mold 25A. The cladding material 27 may consist of various types of tiles, stones, canvases, cloths, paper, metals, etc. which are placed face down in the mold. In some cases, an adhesive material may be placed on the back of the cladding material to ensure an adequate bond. A cementitious layer 29 is then cast on top of the cladding material to create the panel's first skin. Reinforcement material 30 (as also shown in FIG. 9) consisting of a mesh, fibers or other product may be included in the cementitious skin.

Figure 6:
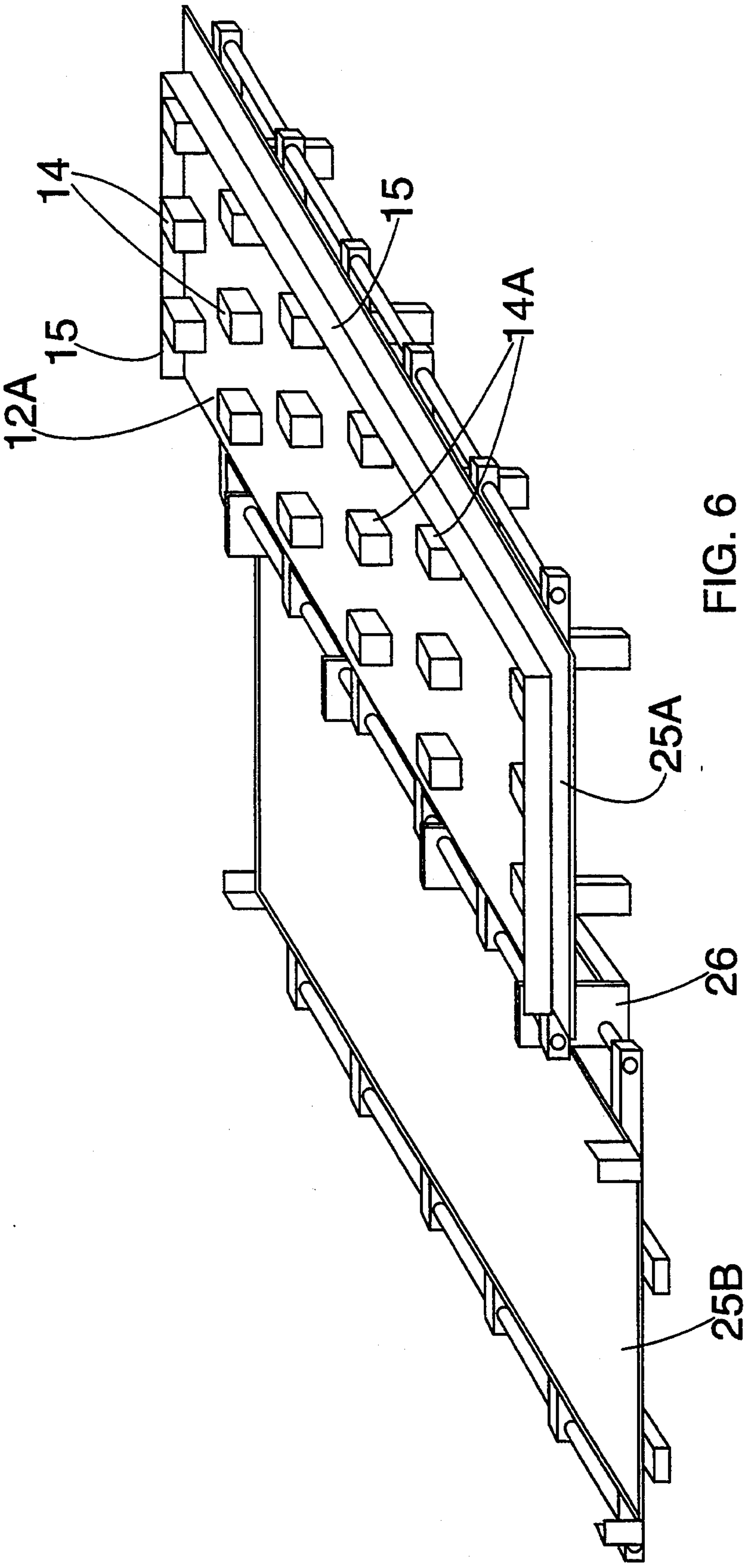
FIG. 6 is a perspective view of FIG. 4 after the spacers and the internal formwork has been placed on the interior side of the first skin.

In a preferred method, while the cementitious skin 12A is still wet, either pre-cast or cast in situ spacers 14 are placed on the top surface of the skin, in the desired positions, and partially embedded or otherwise bonded or secured to the cementitious layer as shown in FIG. 6. Also, the desired internal formwork 15 (FIGS. 1–2) or the actual columns and beams (FIG. 3) are positioned and partially embedded or otherwise bonded or secured to the cementitious skin. The columns and beam may be pre-cast or cast in situ over the skin.

Figure 7:
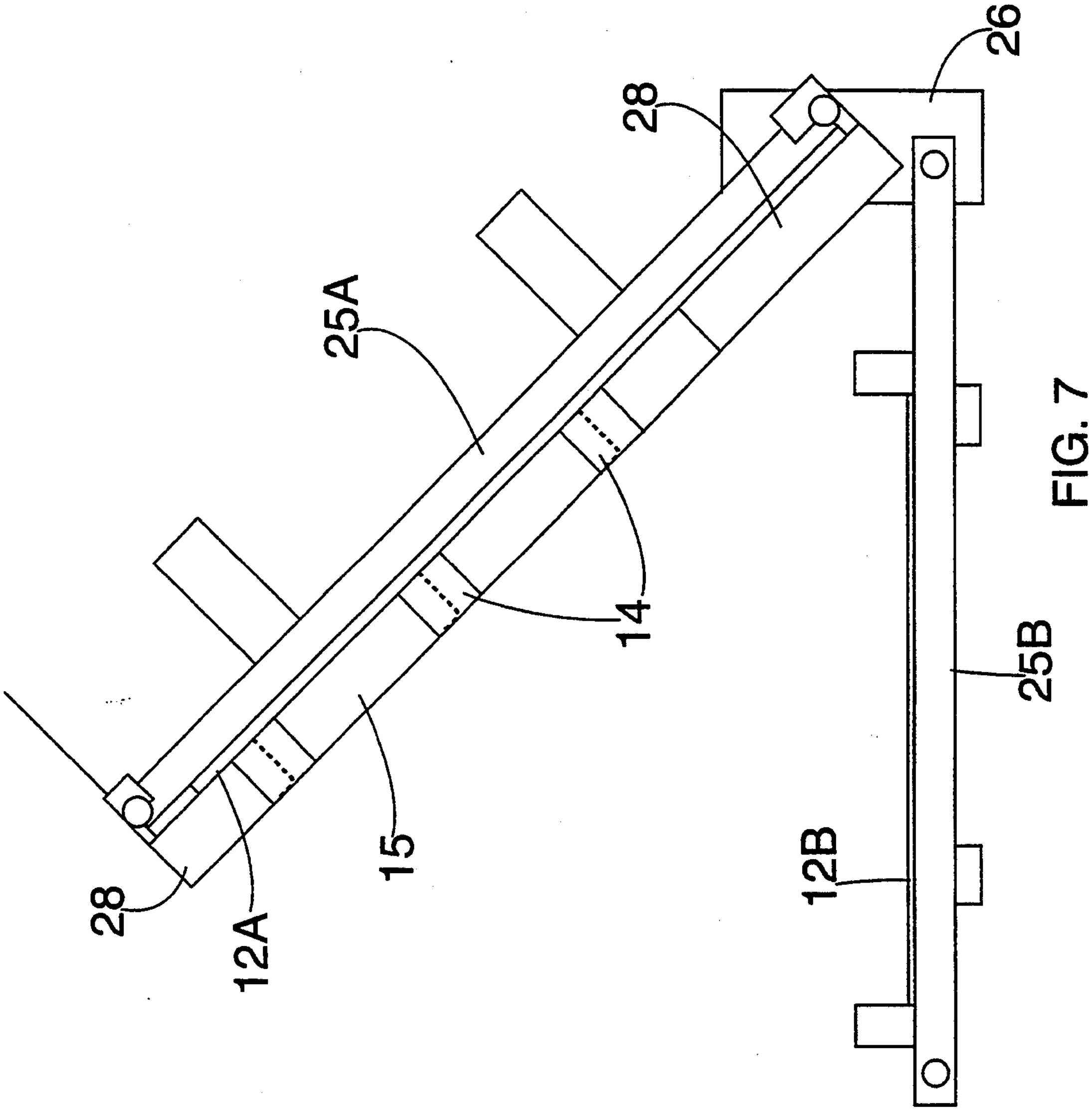
FIG. 7 is a cross section of the first skin mold as it is being rotated for connection to the second skin.

After the first side skin 12A has sufficiently cured (as used in this application, the term "cured" means that the skin has sufficiently hardened that it can be moved or otherwise utilized in the next step in the process, and not necessarily that it is fully cured in a structural sense), a second, separate skin 12B is prepared in the same manner as shown in FIG. 5. As demonstrated in FIGS. 7 and 8, the first skin 12A is rotated 180 degrees with the spacers 14 and internal formwork 15 firmly embedded. This rotation is performed by rotating the mold 25A with the cementitious skin 12A still intact and clamped 28 to the mold 25A. The rotation is facilitated by a large hinge device, 26, to which each mold 25A and 25B are connected during the rotation process.

Rotation of the first skin 12A is preferably done while the second cementitious skin 12B is still wet, and preferably the exposed ends of the spacers 14 are partially embedded in the second skin 12B. In this manner, any variation in the lengths of the projecting spacers 14 relative to one another, or angular variation, will not affect a solid bond between the spacers 14 and second skin 12B, in that such variations will be taken up in the embedding process.

Figure 8:
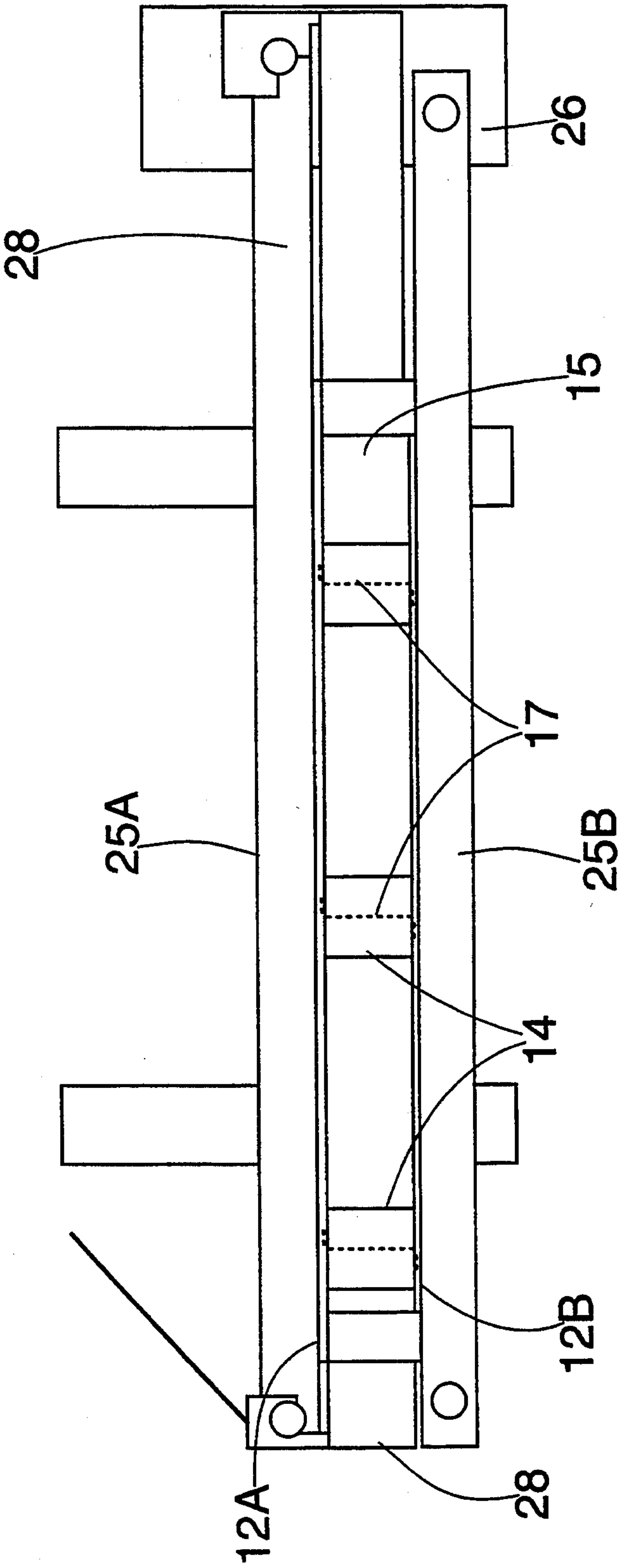
FIG. 8 is a cross section of the two skins being connected with the completion of a 180 degree rotation of the first skin and mold, with the spacers and internal formwork being embedded into the wet, cementitious second skin.

Once the rotation is completed as shown in FIG. 8, the spacers 14 and the internal formwork 15, are both partially embedded or otherwise bonded to the cementitious second skin 12B. The bond may be enhanced by a connecting wire or similar material 17, that is encased in the spacers 14 and embedded into each of the skins 12A and 12B as detailed in FIG. 9.

While in the preferred embodiment the spacers are bonded to the first skin by embedding the spacers while the first skin is still wet, other methods of securing the spacers to the first skin may be employed. In one such method, the spacers are glued to the first skin 12A, either while the skin is wet or after curing. In another method, spacers are cast in situ on the first skin 12A, either before or after curing of the skin. In another embodiment, the spacers are provided with one or more connecting members, e.g. in the form of wire mesh or rods, that extend outwardly from the end of the spacer, and the spacer is secured to the first skin 12A by embedding the connecting member or members into the first skin while the concrete is still wet. Thus, the spacers may be secured to the first skin 12A by chemical (concrete-to-concrete) bonding, by adhesive bonding, and/or by mechanical attachment.

It is also possible to rotate the first skin 12A after the second skin 12B has cured. Care should be taken, when the spacers are secured to the first skin 12A, to ensure that the outer faces of the spacers lie in the same plane in order to make full contact with the second skin surface. Adhesive may be used to bond the spacers to the skin 12B. It will not generally be practical to produce as strong a bond where the spacers 14 and second skin 12B have already cured, and thus this alternative may be limited to applications where shear stress on the second skin 12B will be limited. However, in most applications a strong bond is not needed, and in some applications (e.g., where beams or the like are to be cast between the skins) it may not be necessary to secure the spacers to the second skin at all except as necessary to hold the panel together while it is handled prior to installation. In addition, in applications where the spacers do not, for structural reasons, need to be secured, or strongly secured, to the skins, it may still be desirable to attach one or two spacers securely, for use as lifting spacers for moving the panel.

In the event that insulation material is to be included in the hollow core interior, or that other objects such as plumbing or electrical ducts are to be routed through the panel, such objects may be positioned prior to joining the first skin 12A with the second skin 12B.

If the panel is to contain a door or window frame, formwork for the frame member is positioned on the bottom of the first mold 25A so that the first skin 12A is cast around the outside of the formwork. Corresponding formwork is positioned on the bottom of the mold 25B, and the second skin 12B is similarly cast around the formwork such that, when the first skin 12A is rotated into engagement with the second skin 12B, the formwork sections are positioned opposite to one another and define a through opening for the frame member.

Figure 10:
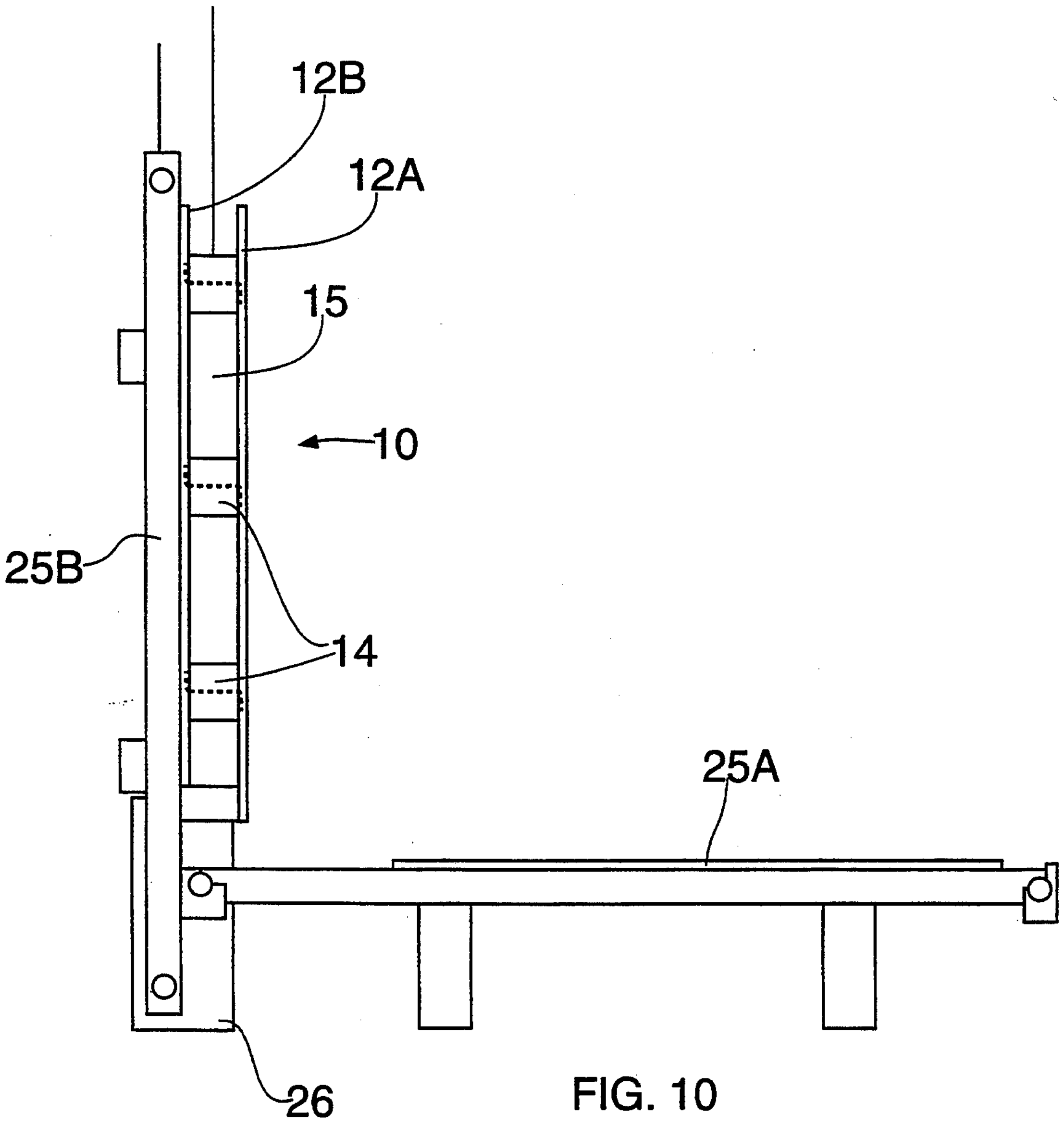
FIG. 10 shows the completed panel being removed from the molding equipment.

When the second skin 12B has sufficiently cured, the finished panel is removed from the mold and ready for placement on the building site. As shown in FIG. 10, this is accomplished by rotating the second mold, 25B, 90 degrees, to a vertical position, with the finished panel 10 still intact. The panel 10, is then lifted vertically from the mold 25B and placed in a storage cart or in its final placement position.

Figure 11:
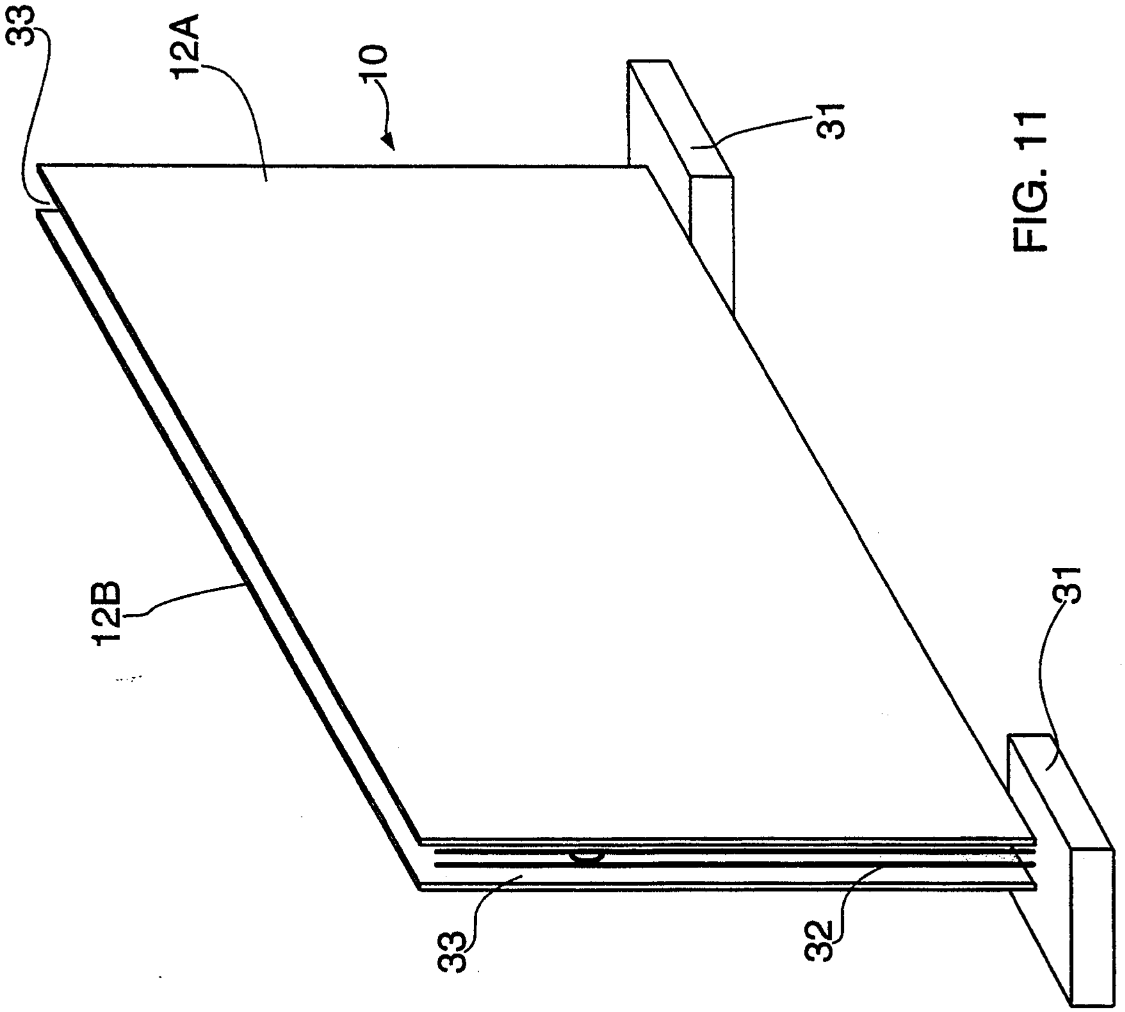
FIG. 11 is a perspective showing a wall panel placement on a foundation that contains reinforcement bars.
Figure 12:
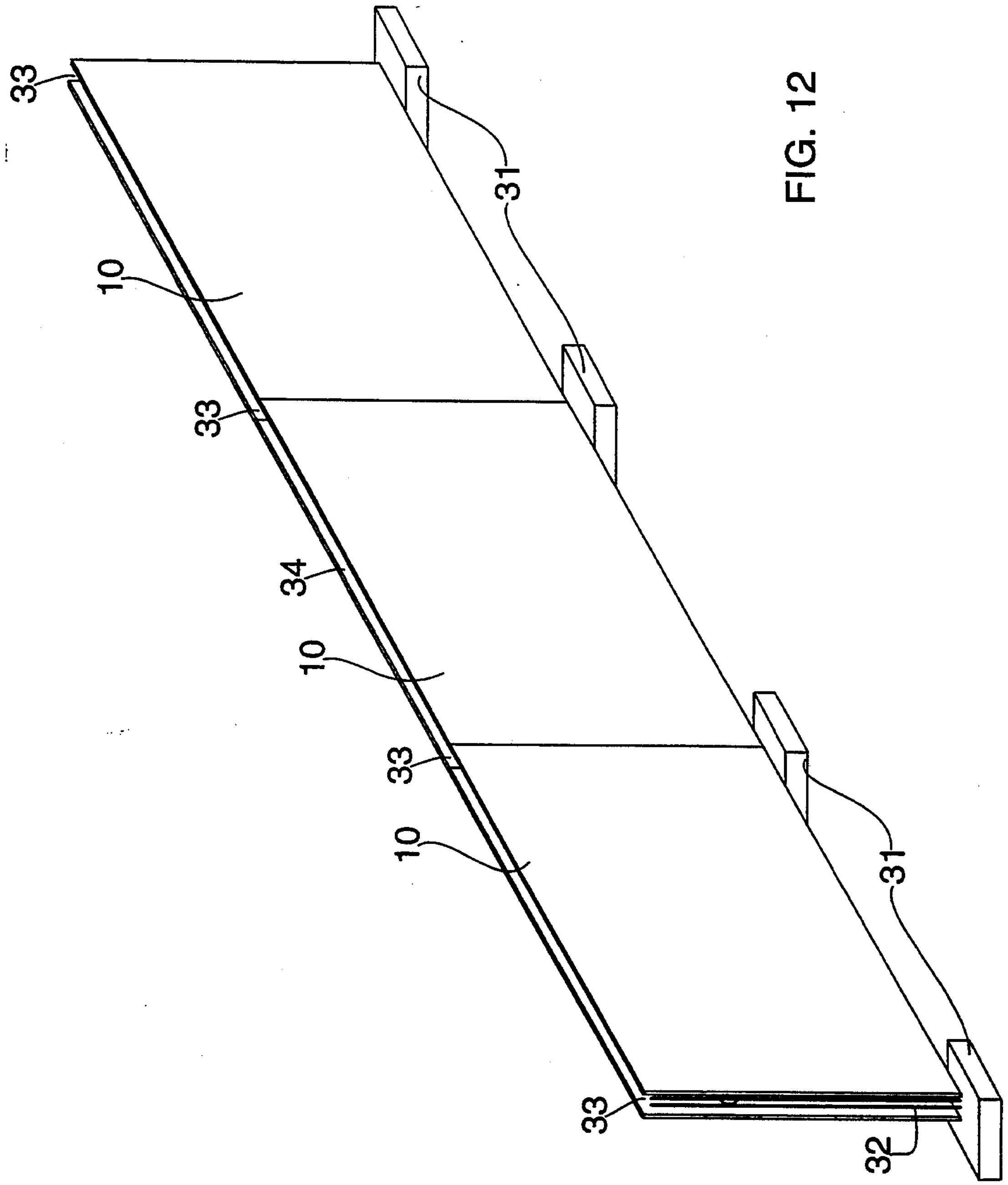
FIG. 12 shows the placement of several wall panels ready for the internal columns and beam to be cast in situ.

Panel installation is accomplished by placing the panel 10 on previously poured foundations 31, as shown in FIG. 11. The appropriate reinforcement 32 has been embedded in and extends from each foundation in the vicinity of the column voids 33 that have been created by the internal formwork 15 contained in the panel 10.

Once the panels have been set in place, they are shored and additional steel reinforcement is placed in the column and beam areas, 33 and 34. The column areas 33, and beam area 34 are then filled with concrete. This concrete creates the bond between the panels 10 and the foundation 31 as well as provides the structural integrity to withstand the various loads for which the panel was designed. The internal formwork 15 confines the cast in situ concrete to only the column and beam areas and leaves intact the hollow core area 18 that may remain void or have been previously filled with an insulating material.

The exterior face of each of the panel skins, 12A and 12B, may be finished with a variety of materials and methods either prior to or after final placement. Depending upon the materials and cladding method, seams may be covered, patched, hidden, revealed or otherwise treated. In the case of canvas, cloth or paper like cladding, the seams may be patched with the conventional process of tape and a joint compound.

An important aspect of the invention is the flexible molding equipment from which different panel sizes and shapes can easily be produced. The molds 25A and 25B can be of most any size and a variety of shapes including convex, concave, curvilinear, flat, and even a combination of these. The mold sides may be moved or positioned at various angles or curves. Even the panel 10 thickness can be altered by changing the spacers 14 size and slightly modifying the mold positions.

The open work environment above each mold 25A and 25B, and the fact the top of the cementitious skin 12A and 12B in these molds are the interior section of the panels, greatly facilitate the placement and embedding of window and door openings, frames and units, utilities and other features that are not yet apparent.

The panel design and its manufacturing and placement process provide great flexibility for using a variety of insulating materials and methods. Either rigid or non-rigid insulation can be installed during the manufacturing process by attaching it to the inside face of skin 12A after it has cured and prior to rotating skin 12A to bond with the second skin, 12B. Other insulating materials can be blown or poured into the panel's hollow core area after the panel 10 has been placed and prior to casting the beam 21 or other panel cap.

There are a number of different foundations that can be utilized with the panel. These include a continuous footer, a slab floor or foundation, a column footer, or another column and beam. These foundations may be cast prior to or after the panel has been set in place and may consist of different materials such as steel or wood. The panels may be stacked to obtain greater heights or for multistory purposes.

Figure 13:
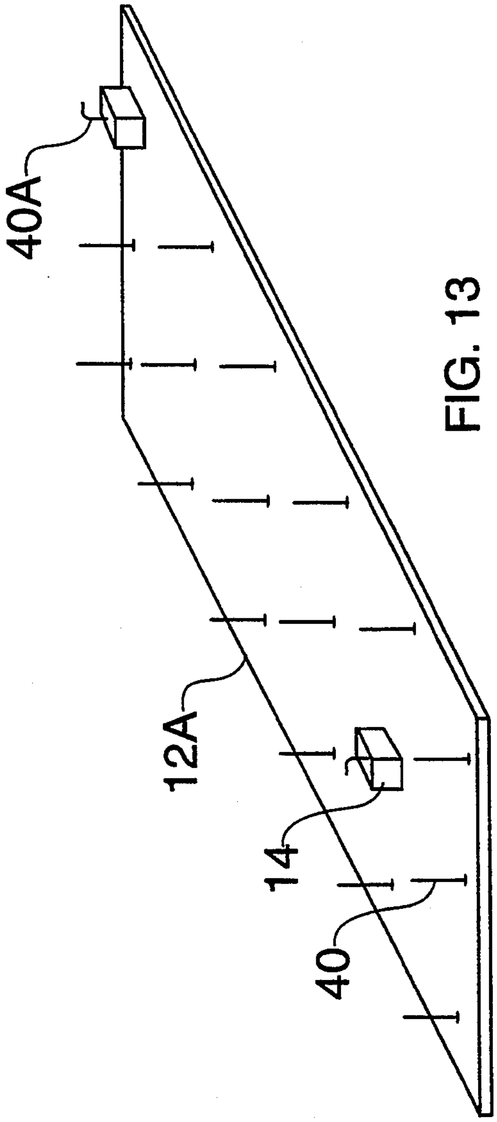
FIG. 13 is a perspective view of a first skin showing spacers cast in situ.

As noted above, the spacers 14 may, if desired, be cast in situ on the first skin. FIG. 13 illustrates a partially completed first panel which is being prepared using this technique.

In the method illustrated by FIG. 13, when the first skin 12A is cast, a plurality of connecting bars 40, or reinforcement bars of wire mesh, are positioned, either before or after casting, so as to project from the upper (exposed) face of the skin 12A. The bars 40 are located in the desired locations for the spacers. Thereafter, the spacers 14 are cast in situ about the reinforcement bars 40 so as to be securely bonded to the skin 12A. Once the spacers 14 are cast and cured, the second skin 12B is cast, and the first skin is positioned such that the spacers are embedded in the second skin, e.g., in the manner shown in FIG. 7.

In the exemplary embodiment illustrated in FIG. 13, the first skin 12A has been removed from its casting mold, and has been cured, prior to casting the spacers 14. However, if desired, skin 12A may be left in its casting mold, e.g. mold 25A. Further, spacers 14 may be cast in situ on top of the first skin 12A while the skin is still wet. Also, while FIG. 13 illustrates connecting bars, the use of connecting bars or mesh is not necessary. Thus, spacers may, if desired, be cast in situ directly on the exposed face of the skin 12A, without connecting members extending into the skin, either before or after the skin has hardened.

In the embodiment shown in FIG. 13, one connecting bar 40 is used for each spacer 14. The bars 40 project a distance greater than the height of the spacers 14, so that an end portion 40A extends from the upper surface of the spacer 14. This end portion 40A, is eventually embedded in the second skin 12B for added strength, and thus forms a mechanical connection between the two skins. The end portions 40A, as well as the opposite ends (which are embedded in skin 12A) may be bent, if desired, for firmer contact with the cement in the respective skin. However, shorter bars 40, which do not extend from the spacers 14, may be employed if desired, and multiple reinforcement bars 40 may be used for each spacer.

A hollow core, concrete building panel according to the invention provides for a highly flexible design, that enables it to be efficiently used in a variety of applications, and a low cost manufacturing process that produces a very cost effective product. Furthermore, the hollow core concrete building panel has the additional advantages in that it may contain internal formwork that enables the columns and beam to be cast in situ, which in turn provides for a more efficient use of materials and a lighter panel for handling purposes. It may also utilize internal, concrete spacers, that are solidly connected to the skins, and act to create the hollow core area by holding the skins both together and apart while occupying only a fraction of the hollow area between them. It may be manufactured in such a way that both skins are cast in a horizontal position to enable attractive finishes by using either form liners or a cladding material attached during the manufacturing process. It also offers the flexibility to be used with several different types of foundations and may even be stacked to achieve greater heights. Moreover, it's hollow core area offers much flexibility in terms of placing different types of insulating materials, utilities and other special features. Finally, it's manufacturing process requires very simple and inexpensive equipment that can be used in a central plant or on the job site.

While the above description contains many specificities, these should not be construed as limitations on the scope of the invention, but rather as an exemplification of one preferred embodiment thereof. Many other variations are possible. For example the two individual skins may be attached in a different manner either during the manufacturing process or at the job site. Or, the panel's columns and beam may be internally cast during the manufacturing process and otherwise attached to the foundation, etc. Also, while examples have been given where connecting bars or wire mesh extends through the spacer, it is possible to-use wire mesh or connecting bars that are embedded at each end of the spacer and project into the respective skin, rather than extending all the way through the spacers. All such modifications and variations are intended to be within the scope of the invention as defined in the following claims.

I claim:

1. A method of manufacturing lightweight, hollow core, concrete building panels comprising the steps of:
casting a first concrete skin in a first horizontal mold, said first concrete skin having internal reinforcing and an exposed internal side; and then
placing a plurality of individual spacers, having first and second ends, in desired positions on said internal side of said first concrete skin;
securing said first ends of said spacers to said first concrete skin by providing a securing means, independent of said internal reinforcing; and
curing said first concrete skin; then
casting a second concrete skin in a second horizontal mold, said second concrete skin having internal reinforcing and an exposed internal side;
moving said cured, first concrete skin and spacers so said second ends of said spacers contact said second concrete skin, and securing said spacers to said second concrete skin by providing a securing means, independent of said internal reinforcing, between said second concrete skin and said spacers; and
curing said second concrete skin; thereby forming said lightweight, hollow core concrete building panel comprising said two concrete skins which are separated by and secured together by said individual spacers, said individual spacers creating an internal, hollow core area between said skins while only occupying a fraction of said hollow core area.

2. A method according to claims 1, wherein said steps of securing said spacers comprise applying adhesive between at least one of said ends of said spacers and at least one of said concrete skins.

3. A method according to claim 1, wherein at least one of said ends of said spacers is partially embedded in at least one of said concrete skins while said at least one of said concrete skins is still wet.

4. A method according to claim 1, wherein at least one of said steps of securing said spacers to said concrete skins comprises securing a mechanical connecting means to said spacers so as to extend from at least one of said ends, and embedding portions of said mechanical connecting means extending from said ends in one of said concrete skins while said one of said concrete skins is still wet.

5. A method according to claim 1, wherein said step of securing said spacers to said first concrete skin comprises providing prefabricated spacers having mechanical connecting means extending therefrom, and partially embedding said spacers and said mechanical connecting means extending therefrom in said first concrete skin while said first concrete skin is still wet.

6. A method according to claim 1, wherein said steps of placing a plurality of individual spacers on said first concrete skin, and securing said first ends to said first concrete skin comprises casting said spacers in situ on said first concrete skin.

7. A method according to claim 6, wherein said step of securing said spacers to said first concrete skin comprises partially embedding securing members in said first concrete skin while said first concrete skin is still wet, such that portions of said securing members extend from said internal side of said first concrete skin, and casting in situ individual spacers about said securing members.

8. A method of claim 1, wherein each of said concrete skins is cast face down in a horizontal mold having a predetermined texture for forming an exterior surface texture on each of said concrete skins.

9. A method of claim 1, wherein permanent formwork is placed in said hollow core area to create areas for casting at least one structural member.

10. A method of claim 9, wherein said formwork at least partially defines a boundary of an enclosed, hollow area between said concrete skins, and comprising the step of placing insulating material into said enclosed, hollow area within said formwork prior to joining said first and second concrete skins.

11. A method of claim 9, wherein said lightweight, hollow core concrete building panel is set in place in an upright position and then said at least one structural member is cast in situ at a building site.

12. A method of claim 1, wherein formwork for at least one object selected from the group consisting of doors, windows frames, utilities, and structural members is positioned in said concrete skins during said manufacturing method.

13. A method according to claim 1, comprising further the steps of: providing formwork means for defining at least three sides of an interior open area when disposed between a pair of concrete skins and which formwork means has opposed edges; embedding one edge of said formwork means in said internal side of said first concrete skin prior to curing; and embedding said opposite edge of said formwork means in said internal side of said concrete skin prior to curing, thereby to define an interior open area between said skins.

14. A method according to claim 13, wherein said formwork means define a top side and opposed sides of said interior open area.

15. A method according to claim 1, comprising additionally the steps of: providing at least one column on said internal side of first concrete skin; bonding said column to said first concrete skin; and bonding said column to said internal side of said second concrete skin when said first concrete skin is secured to said second concrete skin.

16. A method according to claim 15, wherein said steps of bonding said column to said internal sides of said first and second concrete skins comprises the steps of embedding one side of said column in said first concrete skin prior to curing, and thereafter embedding an opposite side of said column in said second concrete skin when said first concrete skin is secured to said second concrete skin.

17. A method according to claim 15, wherein said column has opposite ends, and further comprising the steps of providing at least one reinforcement member that projects from one of said opposite ends of said column and, after formation of said building panel, setting said reinforcement bar in a foundation member at a building site, with said building panel in an upright position, and casting concrete about said reinforcement bar for bonding said building panel to said foundation member.

* * * * *